March 26, 1968 S. R. McCUTCHEON ET AL 3,375,501

PEAK MEMORY CIRCUIT EMPLOYING COMPARATOR FOR CONTROLLING VOLTAGE OF STORAGE CAPACITOR

Filed March 23, 1964

SAMUEL R. McCUTCHEON
ROBERT E. WEBB
INVENTORS.

BY
BUCKHORN, BLORE, KLARQUIST & SPARKMAN
ATTORNEYS 3,375,501

PEAK MEMORY CIRCUIT EMPLOYING COMPARATOR FOR CONTROLLING VOLTAGE OF STORAGE CAPACITOR

Samuel R. McCutcheon, Palo Alto, Calif., and Robert E. Webb, Portland, Oreg., assignors to Tektronix, Inc., Beaverton, Oreg., a corporation of Oregon Filed Mar. 23, 1964, Ser. No. 354,019
8 Claims. (Cl. 340—173)

ABSTRACT OF THE DISCLOSURE

The subject matter of the present invention relates generally to circuits for storing electrical signal voltages, and in particular to memory circuits which may be operated as a peak memory to store maximum signal voltages. The present peak memory circuit employs a comparator for comparing the input signal voltage with a feedback reference voltage corresponding to the voltage on a storage capacitor to switch a gate in order to charge the storage capacitor from a source of D.C. supply voltage when such input signal voltage exceeds such reference voltage until the capacitor voltage is substantially equal to the maximum input signal voltage.

Figure 1:
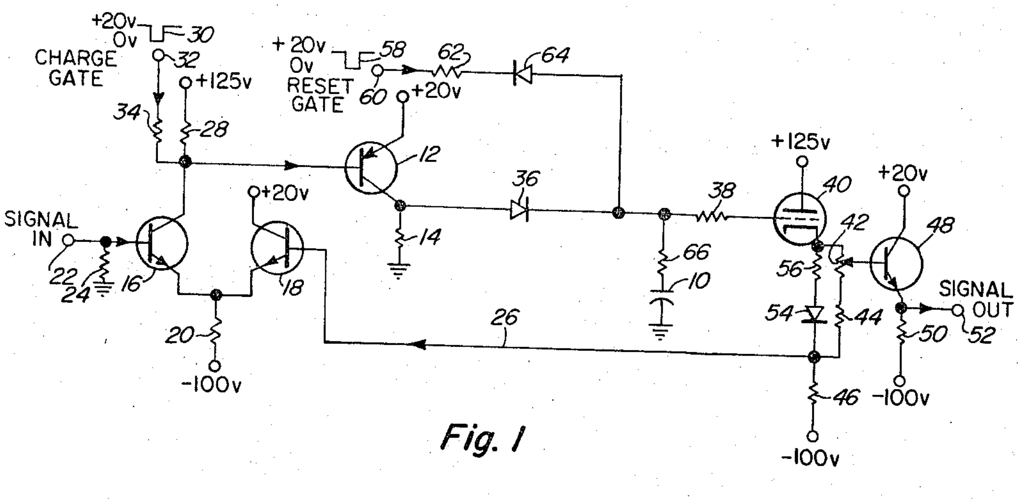

Briefly, one embodiment of the memory circuit of the present invention includes a gating transistor connected between a D.C. voltage source of charging current and a storage capacitor. The input of a cathode follower tube is connected to the storage capacitor and its output is connected through an emitter follower transistor to the output terminal of the memory circuit. A feedback loop is connected between the output of the cathode follower tube and one input terminal of a voltage comparator circuit. The other input terminal of the comparator circuit is connected to the signal voltage source and its output is connected to the input of such gating transistor. When the voltage of the input signal exceeds the voltage stored on the capacitor and applied as a reference voltage to the comparator circuit, an output signal is transmitted from such comparator to the gating transistor to cause it to be rendered conductive, so that charging current flows through the gating transistor to increase the voltage on the storage capacitor until it equals that of the maximum voltage of the input signal. However, when the input signal voltage is less than the stored voltage, the gating transistor remains nonconducting and such stored voltage stays at its previous value. Thus the storage capacitor charges in only one direction and is discharged only when a diode connected thereto is rendered conducting by means of a reset gating pulse. In order to control which one of a plurality of input signals is allowed to change the charge on the storage capacitor, a charge gating pulse is also applied to the input of the gating transistor before such transistor can be rendered conductive by the output signal from the comparator circuit.

The peak memory circuit of the present invention is especially useful when employed in the "100% gate and memory circuit" described in copending U.S. patent application Ser. No. 202,814, entitled, "Stop-Start Logic Circuit" filed June 15, 1962, by Samuel R. McCutcheon. The present memory circuit has several advantages over conventional memory circuits including the advantage of not loading the signal source with the storage capacitor and other memory circuitry because such memory circuit is gated. Furthermore, the peak memory circuit of the present invention is simple and inexpensive, and operates in an accurate and trouble-free manner. The present peak memory circuit employs a hybrid cathode follower amplifier including a vacuum tube and a transistor connected in cascade with the grid of such tube connected to the storage capacitor so that there is less leakage of charge from such capacitor due to the high input impedance of such tube. The output of the hybrid cathode follower is taken from the emitter of the transistor in such circuit to provide a low output impedance.

While the charging and discharging time of the storage capacitor may be made very fast, it is also possible to operate the memory circuit in an "integrate mode" rather than in a "peak mode," by providing greater charging and discharging resistance to prevent any noise signal component in the input signal from changing the voltage on the storage capacitor appreciably because of the short duration of such noise. The integrating memory also enables the voltage on the storage capacitor to be increased or decreased by the input signal so that it operates in both directions, rather than in only one direction. In addition, by employing a charge gating pulse to enable the gating transistor to conduct only at predetermined times, it is possible to select a particular input signal from a group of input signals to change the charge on the storage capacitor in order to determine the maximum voltage amplitude of such particular signal. Also, by increasing the length of the charge gating pulse, the highest amplitude of a group of input signals can be determined, or, if the integrate mode is used, the average maximum signal voltage may be determined.

It is therefore one object of the present invention is to provide an improved memory circuit for storing signal voltages.

Another object of the present invention is to provide an improved memory circuit of simple and inexpensive construction which operates in an accurate and trouble-free manner.

A further object of the present invention is to provide an improved memory circuit which does not appreciably load the source of the input signals applied to such memory circuit.

An additional object of the invention is to provide a peak memory circuit for storing maximum signal voltages on a capacitor without any substantial leakage of the capacitor voltage between signals, by employing a hybrid cathode follower circuit having a high input impedance and a low output impedance including a vacuum tube and a transistor connected in cascade between such capacitor and the output terminal of the circuit.

Still another object of the present invention is to provide an improved peak memory circuit which changes the charge on a storage capacitor in one direction by rendering a gating device conducting in accordance with an input signal to store the maximum amplitude of such input signal on such capacitor.

A further object of the present invention is to provide an improved peak memory circuit which employs a charge gating pulse to determine when an input signal can vary the voltage stored by such memory circuit.

A still further object of the present invention is to provide a memory circuit which can be operated in an integrate mode by increasing the time required to change the charge on a storage capacitor in such circuit to reduce the effect on the charge voltage of any noise signal component contained in the input signal applied to such circuit.

Figure 2:
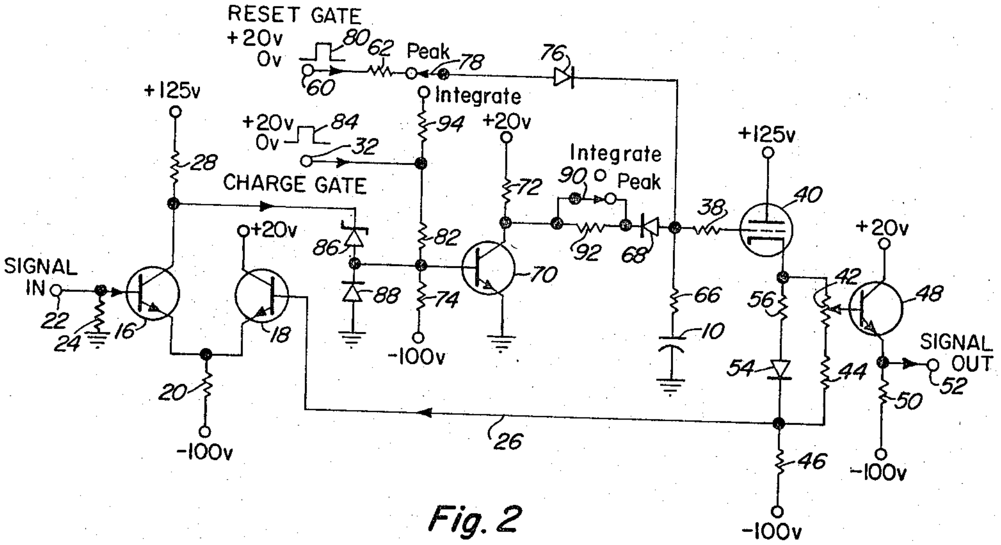

Other objects and advantages of the present invention will be apparent from the following detailed description of certain preferred embodiments thereof, of which:

FIG. 1 is a schematic diagram of one embodiment of the memory circuit of the present invention; and FIG. 2 is a schematic diagram of another embodiment of the memory circuit of the present invention.

As shown in FIG. 1, one embodiment of the peak memory circuit of the present invention for storing positive peak signal voltages includes a storage capacitor 10 of .01 microfarad which is charged by current flowing through a PNP type gating transistor 12 from a source of positive D.C. voltage of +20 volts connected to the emitter of such transistor when the transistor is rendered conducting by an input signal in a manner hereafter described. The gating transistor 12 is connected as a common emitter amplifier and normally biased nonconducting with its collector connected to ground through a load resistor 14 of 22 kilohms. The base of the transistor 12 is connected to the output terminal of a signal comparator circuit formed by a pair of NPN type transistors 16 and 18, whose emitters are connected in common through a bias resistor 20 of 39 kilohms to a source of negative D.C. bias voltage of −100 volts. The base of comparator transistor 16 is connected to an input terminal 22 and to ground through a bias resistor 24 of 100 kilohms. The collector of transistor 18 is connected to a source of positive D.C. vias voltage of +20 volts and the base of such transistor is connected to a positive D.C. reference voltage corresponding to that produced on the storage capacitor 10, by means of a feedback loop including a conductor 26. Thus transistor 18 is normally conducting and transistor 16 is normally nonconducting when the voltage of the input signal is less than such reference voltage.

The collector of comparator transistor 16 is connected through a load resistor 28 of 33 kilohms to a source of positive D.C. bias voltage of +125 volts. When the voltage of the input signals applied to input terminal 22 exceeds the positive reference voltage applied to the base of transistor 18, transistor 16 is rendered conducting to produce a negative going difference signal on the collector of such transistor. This difference signal is applied to the base of the gating transistor 12 and tends to forward bias the gating transistor to a conducting state. However, this cannot happen unless a negative voltage charge gating pulse 30 is applied to an input terminal 32 which is connected through a bias resistor 34 of 9.1 kilohms to the base of gating transistor 12. The charge gating pulse 32 reduces the voltage on input terminal 32 from +20 to zero volts and enables the gating transistor to be rendered conducting when the voltage of the input signal exceeds the reference voltage fed back to the base of transistor 18.

When the gating transistor 12 is rendered conducting D.C. current flows from the +20 volt source connected to the emitter of such transistor, through a disconnect diode 36 having its cathode connected to the upper plate of the storage capacitor 10 to charge such capacitor toward +20 volts from its normal quiescent voltage of zero volt. The voltage produced across the storage capacitor 10 is transmitted through a coupling resistor 38 of 1 kilohm to the grid of a triode vacuum tube 40 connected as a cathode follower amplifier. The anode of tube 40 is connected to a source of positive D.C. bias voltage of +125 volts and its cathode is connected to a source of negative D.C. bias voltage of −100 volts, through a load impedance including a variable resistance potentiometer 42 of 250 ohms and a fixed resistor 44 of 470 ohms connected in series with a main load resistor 46 of 36 kilohms. Thus, tube 40 is connected as a "long tailed" cathode follower having a voltage gain of near unity so that the stairstep voltage produced across the storage capacitor 10 is transmitted to the cathode of the tube as a positive signal voltage. The movable contact of the potentiometer 42 is connected to the base of an NPN type output transistor 48 whose collector is connected to a source of positive D.C. bias voltage of +20 volts and whose emitter is connected to a source of negative D.C. bias voltage of −100 volts through a load resistor 50 of 22 kilohms to provide an emitter follower amplifier. Thus, the output transistor 48 transmits the signal voltage produced on the cathode of tube 40 as a positive stairstep output voltage to an output terminal 52 connected to the emitter of such transistor.

The emitter follower amplifier including transistor 48 provides a low output impedance for a load connected to output terminal 52 and serves as a buffer stage to prevent any load reactance from loading of the cathode follower tube 40. The cathode follower amplifier including tube 40 is connected to the storage capacitor 10 in order to transmit the charge voltage produced across such storage capacitor as an output signal without reducing such voltage due to leakage, due to the high input impedance of the cathode follower and the low grid current of tube 40. Since the tube 40 and the output transistor 48 are connected in cascade, they form a hybrid cathode follower amplifier having the desirable characteristics mentioned above.

A diode 54 and a resistor 56 are connected in series across the potentiometer 42 and the fixed resistor 44 so that such diode provides temperature compensation for the output transistor 48. Thus diode 54 maintains the quiescent D.C. voltage level of output terminal 52 substantially constant, by compensating for any changes in voltage drop across the emitter junction of transistor 48.

A portion of the output voltage produced on the cathode of the tube 40 is transmitted as a reference voltage to the base of comparator transistor 18 through the feedback conductor 26 which is connected across load resistor 46. It should be noted that the voltage on the cathode of tube 40 is not exactly equal to the voltage produced across the storage capacitor 10 due to the grid to cathode bias voltage of such tube. The voltage drop across the resistors 42 and 44 compensates for such grid bias voltage so that the reference voltage on the feedback conductor 26 is equal to the voltage across the storage capacitor. As mentioned previously, the voltage of the input signal applied to input terminal 22 must exceed the reference voltage on the base of transistor 18 before transistor 16 can be rendered conducting and transistor 18 rendered nonconducting, to produce an output signal on the collector of transistor 16. Thus when the storage capacitor 10 charges to a voltage equal to the maximum voltage of the input signal the reference voltage fed back to the base of comparator transistor 18 causes the transistors 16 and 18 to conduct equally and to turn off the gating transistor 12. When the gating transistor is rendered nonconducting, the voltage on the collector of such gating transistor goes negative toward ground and renders the disconnect diode 36 nonconducting due to the positive voltage on storage capacitor 10, so that such capacitor cannot discharge through such diode. The above described operation is repeated several times if subsequent signals have a maximum voltage exceeding that of previously stored signals so that they cause the gating transistor 12 to be rendered conducting when a charge gating pulse is applied to input terminal 32. As a result, the voltage across the storage capacitor increases as a stairstep voltage toward +20 volts which is the upper limit of such voltage.

When it is desired to discharge the storage capacitor a negative voltage reset gating pulse 58 is applied to a gate input terminal 60 and transmitted through a coupling resistor 62 of 1 kilohm and a discharge diode 64 whose anode is connected to the upper plate of the storage capacitor. The cathode of the discharge diode 64 is normally maintained at a D.C. bias voltage of +20 volts so that such diode is normally reversely biased nonconducting due to the fact that the charge on the storage capacitor is always less than +20 volts. However, when the reset gating pulse 58 is applied to input terminal 60, the voltage on the cathode of the discharge diode 64 reduces to zero causing such diode to conduct current away from the storage capacitor 10 in order to enable such storage capacitor to discharge back to its quiescent value of zero volts.

There is some time delay in the feedback loop, including the cathode follower tube 40, conductor 26 and the comparator transistors 16 and 18, so that the gating transistor 12 is not rendered nonconducting until some time after the voltage on the storage capacitor 10 equals the maximum voltage of the input signal applied to input terminal 22. This time delay would ordinarily cause the storage capacitor 10 to charge to a value slightly higher than the peak voltage of the input signal. In order to compensate for this, a small resistor 66 of 14.7 ohms is connected between the cathode of the disconnect diode 36 and the upper plate of the storage capacitor. When the storage capacitor 10 is being charged by current flowing through the gating transistor 12, a small D.C. voltage drop is produced across resistor 66 which is added to the voltage produced across the storage capacitor 10 to provide the input signal applied to the grid of tube 40. This causes a reference voltage to be transmitted to the base of transistor 18 which is sufficient to render the comparator transistor 16 nonconducting before the charge on the storage capacitor reaches the maximum voltage of the input signal. As a result, by the time the gating transistor 12 is switched "off," the charge on the storage capacitor 10 has increased to a peak voltage of the input signal. Once the gating transistor 12 is rendered nonconducting, current no longer flows through resistor 66 so that that input signal applied to the grid of tube 40 is then only the voltage produced on the storage capacitor 10. Thus the resistance of the compensation resistor 66 is critical and should be of a value so that the voltage drop across such resistor is just slightly more than the amplitude of the overshoot peak which would be otherwise produced on the output signal due to the time delay of the feedback loop.

Another embodiment of the memory circuit of the present invention is shown in FIG. 2 for storing the most negative voltage of an input signal. This negative memory circuit is similar to that of FIG. 1 so that the same reference numerals have bene employed to designate similar components. Therefore, only the differences between these two circuits will be described. The storage capacitor 10 of FIG. 2 is connected to the anode of a disconnect diode 68 whose cathode is connected to a source of positive D.C. supply voltage of +20 volts which is connected to the collector of an NPN type gating transistor 70 through a load resistor 72 of 22 kilohms. The emitter of the gating transistor is connected to ground and its base is connected to a source of negative D.C. bias voltage of −100 volts through a bias resistor 74 of 30 kilohms so that such transistor is connected as a common emitter amplifier and is biased normally nonconducting. The upper plate of the storage capacitor 10 is also connected to the cathode of a diode 76 and the anode of such diode is connected through the movable contact of a two position switch 78 to gating input terminal 60. In the "Peak" position of the switch 78, a positive reset gating pulse 80 increases the voltage on the input terminal 60 from zero to +20 volts, causing diode 76 to conduct and the storage capacitor 10 to charge to a quiescent voltage of +20 volts. When the reset gating pulse terminates, diode 76 is rendered nonconducting and the quiescent voltage charge on the storage capacitor 10 is maintained as long as the other diode 68 is rendered nonconducting due to the fact that the gating transistor 70 is nonconducting. The base of the gating transistor 70 is connected through a voltage divider resistor 82 of 10 kilohms to the charge gate input terminal 32. A positive charge gating pulse 84 applied to such input terminal enables the gating transistor 70 to be rendered conducting by a positive signal on the collector of the comparator transistor 16. The collector of comparator transistor 16 is connected through a zener diode 86 through the base of the gating transistor 70 to maintain the voltage on such base 30 volts negative with respect to the collector of such comparator. A diode 88 is also connected between the base of the gating transistor and ground so that bias current from the −100 volt source flows through diode 88 and causes a small negative voltage to be applied to such base to reverse bias the emitter junction of such diode.

The gating transistor 70 is rendered conducting when the negative peak voltage of the input signal applied to input terminal 22 goes below the reference voltage applied to the base of transistor 18 to render the transistor 16 nonconducting and to produce a positive voltage signal on the collector of transistor 16. This causes the storage capacitor to discharge toward zero through the diode 68 and the gating transistor 70. The voltage across the storage capacitor 10 decreases until it has reduced to a voltage corresponding to the input signal voltage and a negative going reference voltage is applied by the feedback conductor 26 to the base of the comparator transistor 18 causes the comparator transistors 16 and 18 to become equally conducting. When the comparator transistor 16 conducts the collector of such transistor goes more negative and causes the gating transistor 70 to be rendered nonconducting. As soon as the gating transistor 70 becomes nonconducting the voltage on the cathode of diode 68 increases to a more positive voltage, rendering such diode nonconducting and preventing further discharge of the storage capacitor.

The above operation is repeated for several successive input signals having a more negative peak voltage than previous input signals and causes the charge on the storage capacitor to decrease accordingly when a positive charge gating pulse 84 is applied to pulse input terminal 32. The result is a negative stairstep voltage produced across the storage capacitor 10 which decreases from a normal quiescent value of +20 volts to a lower limit value of zero volt. This negative stairstep capacitor voltage is transmitted through the cathode follower tube 40 and the emitter follower transistor 48 to the output terminal 52 as a similar negative stairstep output signal. As previously stated the storage capacitor 10 of FIG. 2 is recharged to its original class voltage of +20 volts by applying a reset gating pulse 80 to the pulse input terminal 60 when the switch 78 is in the "Peak" position shown.

The memory circuit of FIG. 2 may also be operated in an "integrate mode" by rotating the movable contact of a switch 90 connected to the collector of the gating transistor 70 from the "Peak" position shown in FIG. 1 to the "Integrate" position so that a previously short circuited discharge resistor 92 of 10 kilohms is then effectively connected in series with the diode 68. The resistor 92 increases the R.C. time constant of the discharge path for the storage capacitor so that when the gating transistor 70 is rendered conducting, less of the voltage on the storage capacitor is discharged during a given time interval. This has the effect of operating as a noise suppressor because any noise signal components in the input signal applied to input terminal 22 which momentarily produce an output signal on the collector of transistor 16 and cause the gating transistor 70 to be rendered conducting for a short time, do not last long enough to decrease the voltage on the storage capacitor 10 appreciably. Of course, by operating the memory in this integrate mode some high frequency input signals will not be stored on the storage capacitor 10 at their maximum negative voltage, because such storage capacitor does not discharge to its peak negative value before the input signal ceases and the gating transistor 70 is rendered nonconducting.

When the switch 90 is moved to the "Integrate" position the switch 78 may also be moved to the "Integrate" position to connect the anode of diode 76 to the pulse input terminal 32 and to the base of the gating transistor 70 through a coupling resistor 94 of 30 kilohms. The charge gating pulse 89 is then applied to the anode of diode 76 to render such diode conducting and to recharge the storage capacitor 10 to its quiescent D.C. level of +20 volts when the gating transistor 70 is not rendered conductive. This charging action takes place at a slower rate than when the switch is connected to the "Peak" position because the charging resistance of resistor 94 is considerably greater than that of resistor 62. Thus, in order to charge the storage capacitor 10 back to its quiescent voltage of +20 volts in the integrate mode, a charge gating pulse must be applied to input terminal 32 but no input signal applied to input terminal 22 so that the gating transistor 70 remains nonconductive.

When the input signal applied to input terminal 22 of FIG. 2 is negative with respect to the reference voltage on feedback conductor 26, comparator transistor 16 is rendered nonconducting to transmit a positive difference signal to the base of the gating transistor 70. This renders such gating transistor conducting when the charge gating pulse 84 is applied thereto and tends to cause the storage capacitor to discharge through such gating transistor. When switch 78 is in the "Integrate" position, a portion of the charge gating pulse is transmitted through the diode 76 to the storage capacitor 10 and tends to charge such storage capacitor. However the charge R.C. time constant is greater than the discharge R.C. time constant because resistor 94 is 30 kilohms while resistor 92 is 10 kilohms, so that the net result is that the charge voltage on the storage capacitor reduces until it equals that of the input signal and causes the gating transistor to become nonconducting.

When the input signal is positive with respect to the reference voltage on feedback conductor 26, comparator transistor 16 is rendered conducting to transmit a negative difference signal to the base of the gating transistor 70 and cause such gating transistor to remain nonconducting during the application of the charge gating pulse 84. However such gating pulse is transmitted through diode 76 to the storage capacitor to increase the charge voltage on such capacitor until the reference voltage on the feedback conductor 26 equals that of the input signal. Thus when the memory circuit of FIG. 2 is operated in an "integrate mode," such circuit operates as a bidirectional memory circuit to increase or decrease the voltage on the storage capacitor in accordance with the input signal, instead of operating as a unidirectional memory circuit as it does when switches 78 and 90 are in the "Peak" positions.

It will be obvious to those having ordinary skill in the art that various changes may be made in the details of the above described preferred embodiments of the present invention, without departing from the spirit of the invention. For example, it is conceivable that the emitter follower transistor 48 could be connected in the feedback loop between the cathode of tube 40 and conductor 26, in which case the temperature compensation diode could be eliminated. Of course the positive peak memory circuit of FIG. 1 can also be provided with an integrate mode in a similar manner to the circuit of FIG. 2. Therefore the scope of the present invention should only be determined by the following claims.

We claim:

1. A peak memory circuit, comprising:

a storage capacitor;

a D.C. voltage source of substantially constant voltage;

gate means connected between said voltage source and said capacitor for controlling the charge voltage produced on said capacitor by current flowing from said voltage source, when said gate means is switched between conduction and nonconduction;

comparator means having its output connected to said gate means and one of its inputs connected to a signal input terminal for producing an output signal which switches said gate means between conduction and nonconduction when an input signal applied to said input terminal exceeds a reference voltage applied to another input of said comparator means;

amplifier means connected between said capacitor and a signal output terminal, said amplifier means having a high input impedance to prevent leakage of the charge off of said capacitor; and feedback means connected from the output of said amplifier means to the other input of said comparator means to feedback the voltage on said capacitor to said comparator means as said reference voltage in order to cause said gate means to change the voltage on said capacitor to a voltage substantially equal to said signal voltage.

2. A peak memory circuit, comprising:

a storage capacitor;

a D.C. voltage source;

gate means connected between said voltage source and said capaitor for controlling the charge voltage produced on said capacitor by current flowing from said voltage source, when said gate means is switched between conduction and nonconduction;

comparator means having its output connected to said gate means and one of its input connected to a signal input terminal for producing an output signal when an input signal applied to said input terminal exceeds a reference voltage applied to another input of said comparator means, and for applying said output signal to said gate means to switch said gate means between conduction and nonconduction;

cathode follower amplifier means connected between said capacitor and a signal output terminal, said amplifier means having a high input impedance to prevent leakage of the charge off of said capacitor and having a low output impedance;

feedback means connected from the output of said amplifier to the other input of said comparator means to transmit the voltage on said capacitor to said comparator means as said reference voltage in order to cause said gate means to change the voltage on said capacitor to a voltage substantially equal to said signal voltage; and means for returning the voltage on said capacitor to its quiescent value through a current path other than said gate means.

3. A peak memory circuit, comprising:

a storage capacitor;

a D.C. voltage source;

gate means connected between said voltage source and said capacitor for controlling the charge voltage produced on said capacitor by current flowing from said voltage source, when said gate means is switched between conduction and nonconduction;

comparator means having its output connected to said gate means and one of its input connected to a signal input terminal for producing an output signal when an input signal applied to said input terminal exceeds a reference voltage applied to another input of said comparator means, and for applying said output signal to said gate means to switch said gate means between conduction and nonconduction;

hybrid cathode follower amplifier means including a vacuum tube and a transistor connected in cascade between said capacitor and a signal output terminal, said amplifier means having a high input impedance to prevent leakage of the charge off of said capacitor, and having a low output impedance;

a resistance connected between said capacitor and the common connection of said gate means and the input of said amplifier means;

feedback means connected from the output of said amplifier to the other input of said comparator means to feedback the voltage on said capacitor to said comparator means as said reference voltage in order to cause said gate means change the voltage on said capacitor to a voltage substantially equal to said signal voltage; and means for returning the voltage on said capacitor to its quiescent value through a current path other than said gate means.

4. A peak memory circuit, comprising:

a storage capacitor;

a D.C. voltage source;

gate means connected between said voltage source and said capacitor for controlling the charge voltage produced on said capacitor by current flowing from said voltage source, when said gate means is switched between conduction and nonconduction;

comparator means having its output connected to said gate means and one of its input connected to a signal input terminal for producing an output signal when an input signal applied to said input terminal exceeds a reference voltage applied to another input of said comparator means, and for applying said output signal to said gate means to switch said gate means between conduction and nonconduction;

a first unilateral conducting means connected between said gate means and said capacitor for enabling said charge voltage to be varied in only one direction by an input signal applied to said signal input terminal;

amplifier means connected between said capacitor and a signal output terminal, said amplifier means having a high input impedance to prevent leakage of the charge off of said capacitor;

a second unilateral conducting means connected to said capacitor for returning the voltage on said capacitor to its normal quiescent value of a predetermined time;

feedback means connected from the output of said amplifier to the other input of said comparator means to transmit the charge voltage on said capacitor to said comparator means as said reference voltage;

means for applying a gating pulse to said gate means to enable said gate means to become conducting when the output signal of said comparator means is also applied thereto in order to change the voltage on said capacitor to a voltage substantially equal to said signal voltage; and means for applying a gating pulse to said second unilateral conducting means to cause the voltage on said capacitor to its quiescent level through a current path other than said gate means.

5. A peak memory circuit, comprising:

a storage capacitor;

a D.C. voltage source of charging current;

a gating transistor connected between said voltage source and said capacitor for controlling the charge voltage produced on said capacitor by current flowing from said voltage source, when said gate means is switched to a conducting state;

a diode connected between the output of said gating transistor and said capacitor;

a vacuum tube connected as a cathode follower amplifier with its grid connected to said capacitor;

an output transistor connected as an emitter follower amplifier having its base connected to the cathode of said tube and its emitter connected to a signal output terminal;

a first comparator transistor having its base connected to a signal input terminal and its collector connected to the input of said gating transistor;

a second comparator transistor having its emitter connected to the emitter of said first comparator transistor to form a voltage comparator circuit with an output signal of said comparator circuit being transmitted from the collector of said first comparator transistor when an input signal applied to said input terminal exceeds a reference voltage applied to the other input of said comparator circuit at the base of said second comparator transistor, said output signal of the comparator circuit switching said gating transistor to a conducting state;

a feedback circuit connected between the cathode of said tube and the base of said second comparator transistor to provide said reference voltage from the capactior voltage; and means for discharging said capacitor.

6. A positive peak memory circuit, comprising:

a storage capacitor having one plate grounded;

a D.C. voltage source of charging current;

a gating transistor connected as a common emitter amplifier with its emitter connected to said voltage source and its collector connected to the other plate of said capacitor for controlling the charge voltage produced on said capacitor by current flowing from said voltage source, when said gate means is switched to a conducting state;

a first diode connected between the collector of said gating transistor and the other plate of said capacitor;

a vacuum tube connected as a cathode follower amplifier with its grid connected to the other plate of said capacitor;

an output transistor connected as an emitter follower amplifier having its base connected to the cathode of said tube and its emitter connected to a signal output terminal;

a first comparator transistor having its base connected to a signal input terminal and its collector connected to the base of said gating transistor;

a second comparator transistor having its emitter connected to the emitter of said first comparator transistor to form a voltage comparator circuit with an output signal of said comparator circuit being transmitted from the collector of said first comparator transistor when an input signal applied to said input terminal exceeds a reference voltage applied to the other input of said comparator circuit at the base of said second comparator transistor, said output signal of the comparator circuit switching said gating transistor to a conducting state;

a voltage feedback circuit connected between the cathode of said tube and the base of said second comparator transistor to provide said reference voltage from the capacitor voltage;

means for applying gating pulses to the base of the gating transistor to enable said gating transistor to be rendered conducting by the output signal of said voltage comparator circuit to increase the voltage on said capacitor;

a resistor connected between the other plate of said capacitor and the common connection of the grid of said tube and said first diode;

a second diode connected to said capacitor in opposite polarity to said first diode and normally biased nonconducting; and means for applying gating pulses to said second diode to render said second diode conducting to discharge the voltage on said capacitor to its quiescent value.

7. A negative peak memory circuit, comprising:

a storage capacitor;

a D.C. voltage source of charging current;

a gating transistor connected as a common emitter amplifier with its collector connected to said voltage source and to said capacitor and its emitter grounded, for controlling the charge voltage produced on said capacitor by current flowing from said voltage source, when said gate means is switched to a conducting state;

a diode connected between the collector of said gating transistor and said capacitor;

a vacuum tube connected as a cathode follower amplifier with its grid connected to said capacitor and said diode;

an output transistor connected as an emitter follower amplifier having its base connected to the cathode of said tube and its emitter connected to a signal output terminal;

a resistor connected between said capacitor and the common connection of said diode and the grid of said tube;

a first comparator transistor having its base connected to a signal input terminal and its collector connected to the base of said gating transistor;

a second comparator transistor having its emitter connected to the emitter of said first comparator transistor to form a voltage comparator circuit with an output signal of said comparator circuit being transmitted from the collector of said first comparator transistor when an input signal applied to said input terminal exceeds a reference voltage applied to the other input of said comparator circuit at the base of said second comparator transistor, said output signal of the comparator circuit switching said gating transistor to a conducting state; and a feedback circuit connected between the cathode of said tube and the base of said second comparator transistor to provide said reference voltage from the capacitor voltage.

8. A memory circuit, comprising:

a storage capacitor;

a D.C. voltage source of charging current;

a gating transistor connected to said voltage source and said capacitor;

a first diode connected between output of said gating transistor and said capacitor;

a vacuum tube connected as a cathode follower amplifier with its grid connected to said capacitor and its cathode connected to a signal output terminal;

a first comparator transistor having its base connected to a signal input terminal and its collector connected to the input of said gating transistor;

a second comparator transistor having its emitter connected to the emitter of said first comparator transistor to form a voltage comparator circuit with a difference signal output of said comparator circuit being transmitted from the collector of said first comparator transistor;

a feedback circuit connected between the cathode of said tube and the base of said second comparator transistor;

means for applying gating pulses to the input of the gating transistor to enable said gating transistor to be rendered conducting by the output signal of said voltage comparator circuit to vary the voltage on said capacitor in one direction;

a second diode connected to said capacitor in opposite polarity to said first diode and normally biased nonconducting; and selector means for connecting a first coupling resistance between said capacitor and the common connection of said voltage source and said gating transistor to increase the time required to change the charge voltage on said capacitor so that noise signal components in said input signal do not appreciably affect said charge voltage, and for connecting said second diode to a reset gate terminal for peak memory operation or to the input of said gating transistor through a second coupling resistance of greater value than said first coupling resistance to enable the gating pulses to be transmitted through said second diode to vary the voltage on said storage capacitor in the opposite direction to said one direction by integration of said gating pulses so that said memory circuit operates as a bidirectional memory to store a voltage on said capacitor corresponding to the voltage of input signals applied to said signal input terminal.

References Cited

UNITED STATES PATENTS

| | | | |
|---|---|---|---|
| 2,840,707 | 6/1958 | Johnson | 328—151 |
| 2,947,975 | 8/1960 | Brown | 340—173 |
| 3,158,426 | 11/1964 | Doersam et al. | 346—107 |
| 3,196,292 | 7/1965 | McCutcheon | 307—88.5 |
| 3,211,924 | 10/1965 | Beck | 328—151 X |
| 3,248,655 | 4/1966 | Kobbe et al. | 328—151 X |
| 3,273,013 | 9/1966 | Shepard | 315—168 |

BERNARD KONICK, *Primary Examiner.*

J. F. BREIMAYER, *Assistant Examiner.*

UNITED STATES PATENT OFFICE
CERTIFICATE OF CORRECTION

Patent No. 3,375,501 March 26, 1968

Samuel R. McCutcheon et al.

It is certified that error appears in the above identified patent and that said Letters Patent are hereby corrected as shown below:

Column 5, line 38, "bene" should read -- been --. Column 6, line 16, "causes" should read -- to cause --. Column 8, lines 16 and 47 and Column 9, line 7, "input", each occurrence, should read -- inputs --. Column 8, line 67, before "change" insert -- to --. Column 9, line 38, after "capacitor" insert -- to discharge --; line 73, "capactior" should read -- capacitor --.

Signed and sealed this 29th day of July 1969.

(SEAL)
Attest:

Edward M. Fletcher, Jr.
Attesting Officer

WILLIAM E. SCHUYLER, JR.
Commissioner of Patents